Feb. 23, 1960  W. N. COX  2,925,843
VEHICLE TIRE CHAIN ASSEMBLY
Filed Aug. 15, 1958
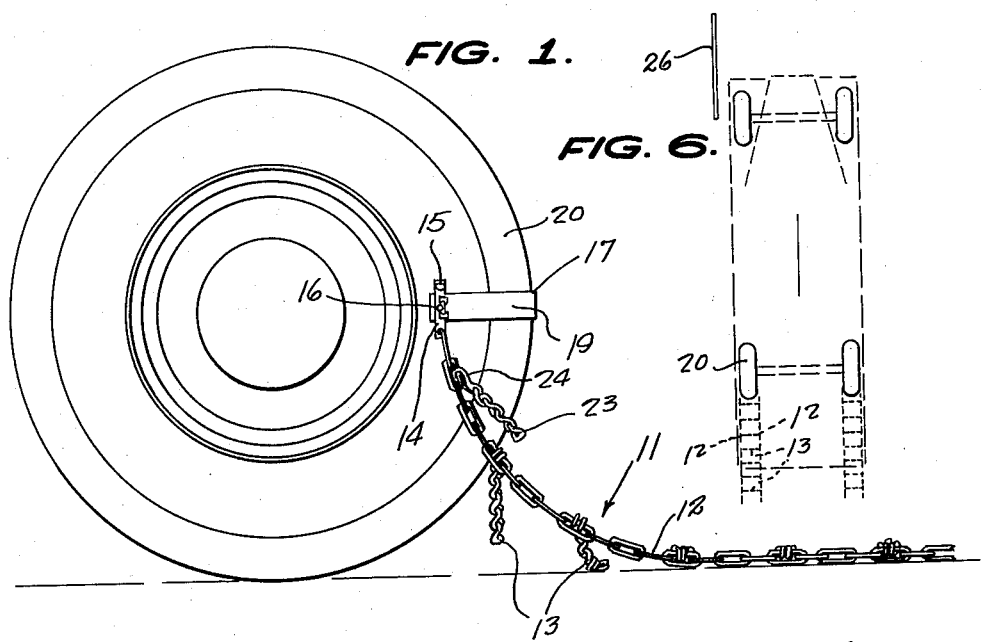
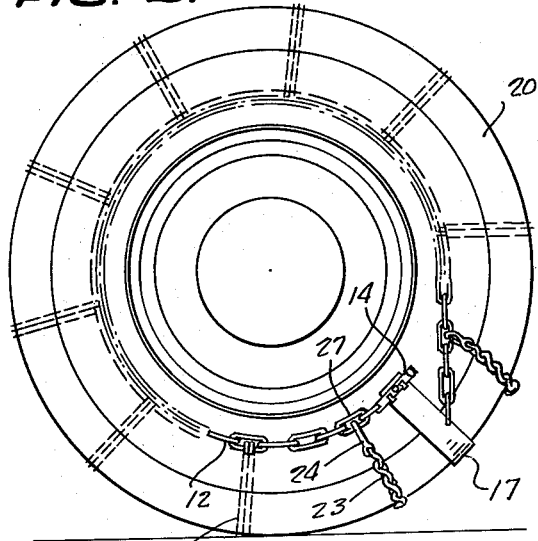
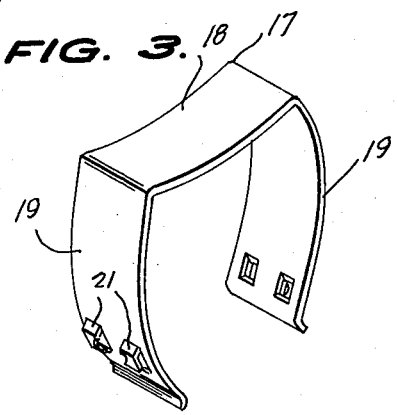
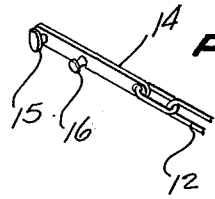
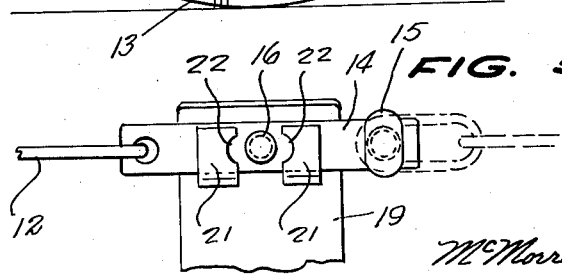
INVENTOR.
WYLIE N. COX,
BY
McMorrow, Berman + Davidson
ATTORNEYS.

United States Patent Office 2,925,843
Patented Feb. 23, 1960

2,925,843
VEHICLE TIRE CHAIN ASSEMBLY
Wylie N. Cox, Auburn, Wash.

Application August 15, 1958, Serial No. 755,268

3 Claims. (Cl. 152—213)

This invention relates to automotive tire chain assemblies, and more particularly to a tire chain provided with means for quickly and easily applying same to a vehicle tire.

A main object of the invention is to provide a novel and improved vehicle tire chain assembly which is simple in construction, which is easy to mount on a vehicle tire, and which eliminates the necessity of jacking up the vehicle in order to mount the chain thereon.

A further object of the invention is to provide an improved vehicle tire chain assembly which involves inexpensive components, which is durable in construction, and which is easy to mount on a tire and to remove therefrom.

Further objects and advantages of the invention will become apparent from the following description and claims, and from the accompanying drawings, wherein:

Figure 1 is a side elevational view of a vehicle wheel illustrating the manner in which the resilient collar member is engaged on the vehicle tire as a first step in mounting the associated chain on the tire.

Figure 2 is a side elevational view of the vehicle wheel of Figure 1. showing the chain wrapped on the wheel preparatory to anchoring the end link thereof.

Figure 3 is an enlarged perspective view of the resilient collar member employed in Figures 1 and 2.

Figure 4 is an enlarged perspective view of one of the fastening link bars employed in the tire chain assembly of Figures 1 and 2.

Figure 5 is an enlarged elevational view showing the manner in which the fastening link bar of Figure 4 is lockingly interengaged with the spaced hook-like lugs on a side arm of the resilient collar member.

Figure 6 is a diagrammatic view illustrating the manner in which a gauge bar is employed with a motor vehicle to accurately measure the distance necessary for the vehicle to move in order to wrap the tire chains on the rear wheels of the vehicle.

Referring to the drawings, 11 generally designates a vehicle tire chain assembly according to the present invention. The tire chain assembly comprises a pair of side chains 12, 12 connected by spaced transverse additional chains 13 and adapted to be engaged on the periphery of a vehicle tire. Connected to the ends of the side chains 12, 12 are respective fastening link bars 14, said link bars being provided at their free ends with headed lug elements 15 adapted to be lockingly engageable with the opposite end portions of the side chains 12 to fasten said side chains around a vehicle tire, as will be presently described. The link bars are provided at their intermediate portions with headed lug elements 16 for a purpose presently to be described.

Designated at 17 is a resilient collar member having a bight portion 18 and arcuately curved opposing resilient side arms 19, 19, said collar member being adapted to clampingly engage on a vehicle tire 20 in the manner illustrated in Figures 1 and 2 with the side arms 19, 19 clampingly engaging the opposite side walls of the tire.

Each of the side arms 19, 19 is formed with a pair of spaced, outwardly struck, hook-like lugs 21, 21 which open toward the free end portions of the side arms 19, 19 and which are formed with the arcuate notches 22 on their inner opposing side edges, as shown in Figure 5.

The spaced lugs 21, 21 are adapted to receive the link bars 14 in the manner illustrated in Figure 5, with the headed intermediate lug member 16 of the link bars received between the opposing hook-like lugs 21, 21, whereby to secure the link bars 14 to the side arms of the clamping collar 17 when said collar is clampingly engaged with a vehicle tire in the manner illustrated in Figure 1.

The lug elements 21, 21 are sufficiently resilient to clampingly secure the link bars 14 and to hold them in positions such as illustrated in Figure 5 while the chain is wrapped on the vehicle tire in a manner presently to be described.

The chain assembly is provided with one transversely extending chain section 23 having a snap hook 24 at its end, the chain 23 being of a length so that when the chain assembly is engaged on the tire, the snap hook 24 may be engaged with a link of one of the side chains 12 to take up any slack in the assembly, as will be presently explained.

In mounting the chain assembly on a vehicle tire 20, the collar member 18 is first engaged on the tire in the manner illustrated in Figure 1 and the link bars 14 of the respective side chains are engaged with the opposite side arms 19, 19 of the clamping collar, each link bar being clampingly engaged between a pair of lugs 21, 21 with the headed stud element 16 thereof disposed between the lugs, as shown in Figure 5. After the clamping collars 19 have been engaged on the respective rear wheels of the vehicle, in the manner above described, and after the link bars have been engaged on the side arms of the clamping collars in the manner shown in Figure 1, the respective chains are laid out rearwardly of the wheels and arranged longitudinally, as shown in Figure 6. A gauge bar 26 is then disposed at the side of the vehicle with one end thereof aligned with the transverse plane containing the axis of the front wheels, the gauge bar 26 being of a length corresponding to the circumferential length of the tires. The vehicle is then moved forwardly until the transverse plane of the axis of the front wheels is substantially at the forward end of the gauge bar 26. This causes the chains to be wrapped around the rear wheels of the vehicle and to assume the positions shown in Figure 2. At this point the snap hooks 24 may be disengaged from their associated chain links 27, allowing the ends of the longitudinal chains 12 to be engaged with the headed lugs 15 on the free ends of the link bars 14. Following this, the snap hooks 24 may be re-engaged with their associated links 27, whereby the transverse chain elements 23 tighten the assembly and remove undesired slack therefrom.

As above explained, chains 23 are short enough so that when their snap hooks 24 are engaged with the associated chain links 27 the chain assembly is relatively tight and relatively little slack exists therein.

After the chains have been thus engaged on the tires 20, the resilient clamping collars 17 may be removed and stored for future use with the vehicle.

While a specific embodiment of an improved vehicle tire chain assembly has been disclosed in the foregoing description, it will be understood that various modifications within the spirit of the invention may occur to those skilled in the art. Therefore it is intended that no limitations be placed on the invention except as defined by the scope of the appended claims.

What is claimed is:
1. A vehicle tire chain assembly comprising a pair of chains connected by transverse additional chains and adapted to be engaged on the periphery of a vehicle tire, respective flat fastening link bars connected to the ends of said first-named chains, headed lug elements on the ends of said link bars lockingly engageable with the opposite end portions of said first-named chains, additional lug elements on the intermediate portions of said link bars, a resilient collar member adapted to clampingly engage on the vehicle tire, and respective pairs of parallel, spaced hook-like lugs on the sides of said collar member constructed and arranged to at times receive said link bars with said additional lug elements disposed between the respective hook-like lugs of said pairs.

2. A vehicle tire chain assembly comprising a pair of chains connected by transverse additional chains and adapted to be engaged on the periphery of a vehicle tire, respective flat fastening link bars connected to the ends of said first-named chains, headed lug elements on the ends of said link bars lockingly engageable with the opposite end portions of said first-named chains, additional lug elements on the intermediate portions of said link bars, and means clampingly engageable on the vehicle tire and including spaced pairs of hook-like lugs on the opposite sides thereof, said last-named means being arranged to at times clampingly receive said link bars with said additional lug elements disposed between the respective hook-like lugs of said pairs.

3. A vehicle tire chain assembly comprising a pair of chains connected by transverse additional chains and adapted to be engaged on the periphery of a vehicle tire, respective flat fastening link bars connected to the ends of said first-named chains, headed lug elements on the ends of said link bars lockingly engageable with the opposite end portions of said first-named chains, additional headed lug elements on the intermediate portions of said link bars, a resilient metal clamping collar of substantial width having a bight portion and arcuately curved side arms, said clamping collar being adapted to clampingly engage on the vehicle tire, and respective pairs of parallel, spaced hook-like lugs struck out from the end portions of said side arms and being constructed and arranged to at times receive said link bars with said additional headed lug elements disposed between the respective hook-like lugs of said pairs, said spaced hook-like lugs being formed with notches on their opposing inner side edges.

References Cited in the file of this patent

UNITED STATES PATENTS

| | | |
|---|---|---|
| 2,478,335 | Stark | Aug. 9, 1949 |
| 2,834,391 | Hellman | May 13, 1958 |